United States Patent [19]

Persson

[11] 4,287,800

[45] Sep. 8, 1981

[54] FRAME SAW WITH HORIZONTALLY MOVABLE GUIDE SYSTEM

[76] Inventor: Gustaf A. Persson, Per Hallströms väg 2, S-131 00 Nacka, Sweden

[21] Appl. No.: 68,510

[22] Filed: Aug. 22, 1979

[30] Foreign Application Priority Data

Aug. 24, 1978 [SE] Sweden ............................ 7808956

[51] Int. Cl.[3] ........................ B23D 49/04; B26D 1/06

[52] U.S. Cl. .................................. 83/425.3; 83/628; 83/751; 83/757

[58] Field of Search .................... 83/425, 425.2, 425.3, 83/426, 427, 436, 628, 751, 757, 768, 776, 777, 778, 779

[56] References Cited

U.S. PATENT DOCUMENTS

| | | | |
|---|---|---|---|
| 264,473 | 9/1882 | Nixon | 83/751 |
| 2,842,172 | 7/1958 | Woodruff | 83/778 X |
| 2,864,413 | 12/1958 | Arneman et al. | 83/427 |
| 3,322,170 | 5/1967 | Persson | 83/425.3 |

FOREIGN PATENT DOCUMENTS

| | | |
|---|---|---|
| 881258 | 5/1953 | Fed. Rep. of Germany . |
| 1453181 | 3/1969 | Fed. Rep. of Germany . |
| 1528044 | 4/1970 | Fed. Rep. of Germany . |
| 2638964 | 3/1978 | Fed. Rep. of Germany . |
| 2721841 | 11/1978 | Fed. Rep. of Germany . |
| 2721842 | 11/1978 | Fed. Rep. of Germany . |
| 194103 | 5/1964 | Sweden . |
| 215830 | 11/1967 | Sweden . |
| 391271 | 8/1965 | Switzerland . |

*Primary Examiner*—Frank T. Yost
*Assistant Examiner*—Robert P. Olszewski
*Attorney, Agent, or Firm*—Frishauf, Holtz, Goodman and Woodward

[57] ABSTRACT

Frame saw for sawing of essentially horizontally fed timber comprising a plurality of spaced apart saw blades placed substantially perpendicular to the direction of feed of the timber, i.e. without overhand. A crankshaft is connected to a sash in which the said saw blades are clamped to impart to the sash a reciprocating upward and downward motion with upper and lower turning points in relation to and controlled by a system of guides which by the said crankshaft via one or several guide connecting rods and via one or several controlled guide links is arranged to be moved or phase-displaced in the direction of feed of the timber before the sash is moved. The guide system and the guide connecting rods are designed with fulcrums in or in relation to the said guide links, which are pivotably disposed. The fulcrums of the guide system are so located in relation to the fulcrums of the guide connecting rod that the fulcrums of the guide system move along a circular arc with a shorter radius than do the fulcrums of the guide connecting rod.

This arrangement imparts to the guide system and thus to the saw blades a movement with such a horizontal component as to cause the guide system to be displaced against the feed direction of the timber when the sash and thus the saw blades are in the vicinity of the said upper turning point and during the downward movement, and in such a complementary horizontal movement in the feed direction of the timber when the sash and thus the saw blades are in the vicinity of the said lower turning point and on their way up. Thus, the cutting engagement of the saw blades with the timber becommes more or less constant during the greater part of the cutting period.

13 Claims, 31 Drawing Figures

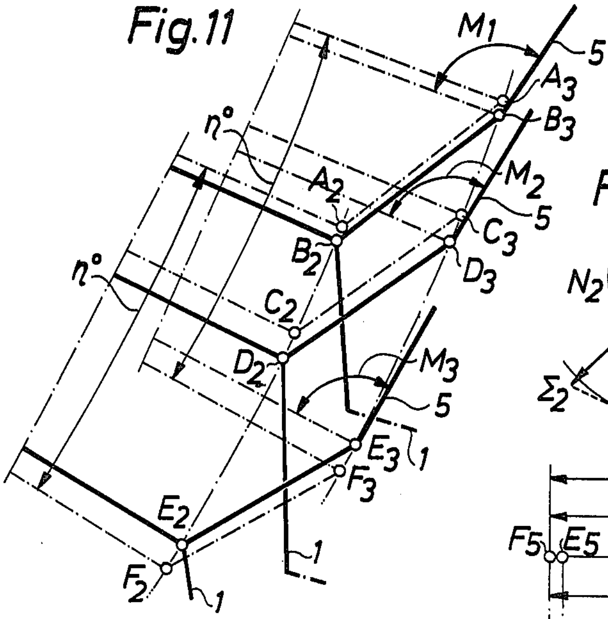
Fig.11
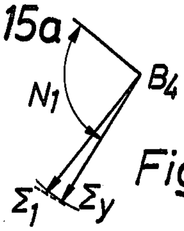
Fig.15a
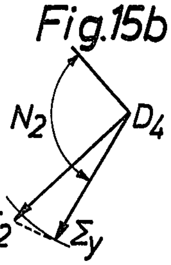
Fig.15b
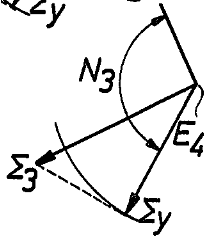
Fig.15c
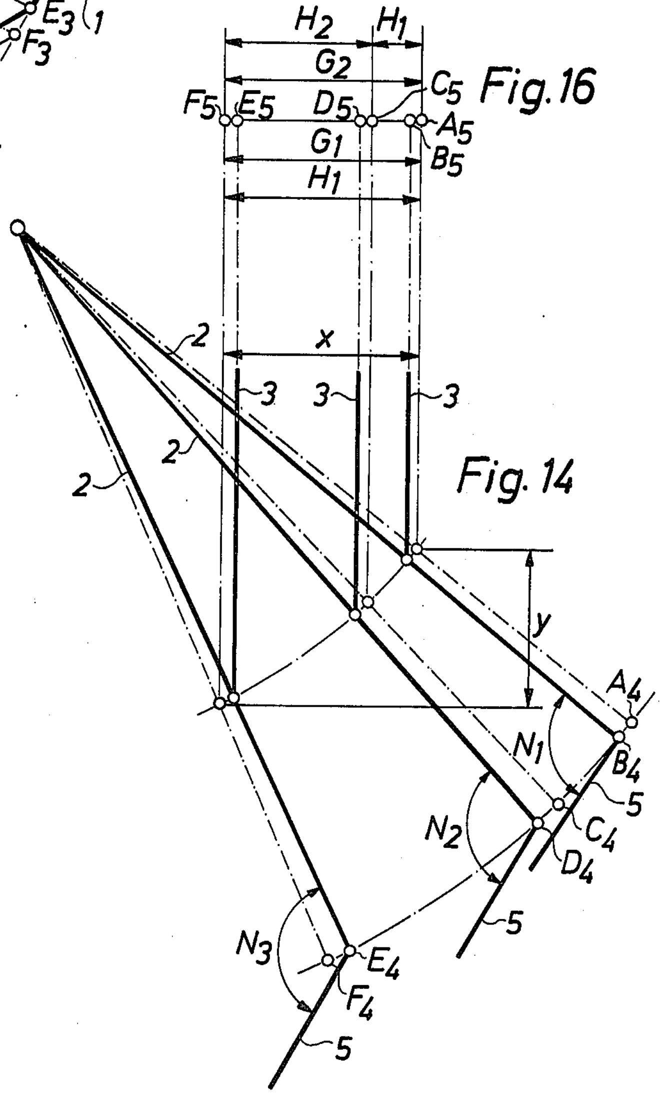
Fig.16
Fig.14
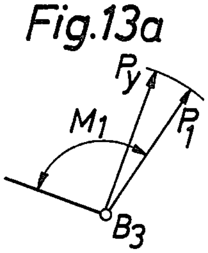
Fig.13a
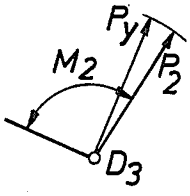
Fig.13b
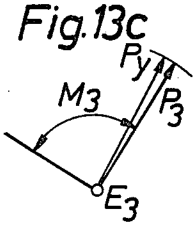
Fig.13c Fig. 19
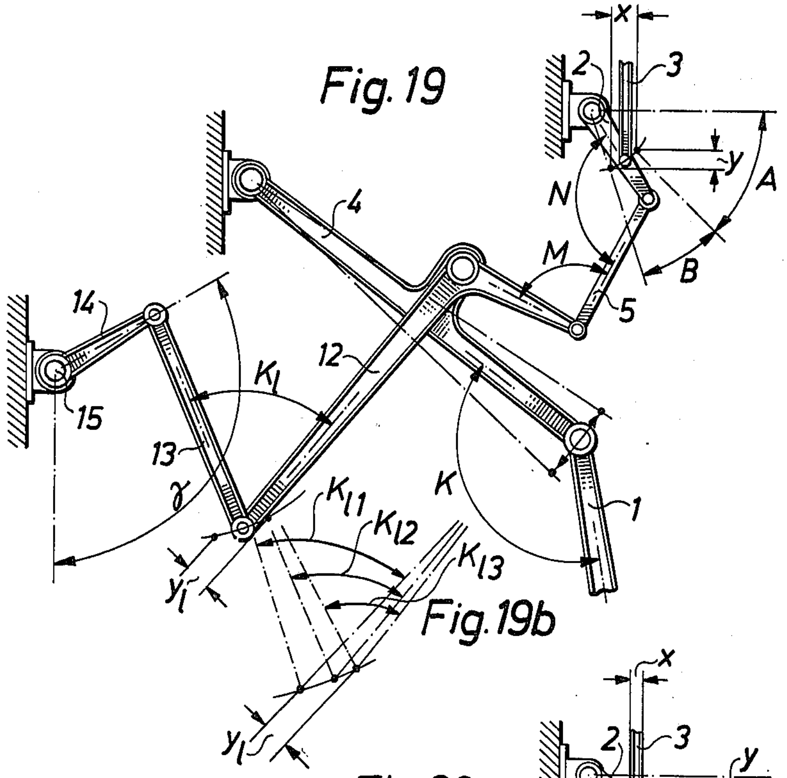
Fig. 19b
Fig. 20
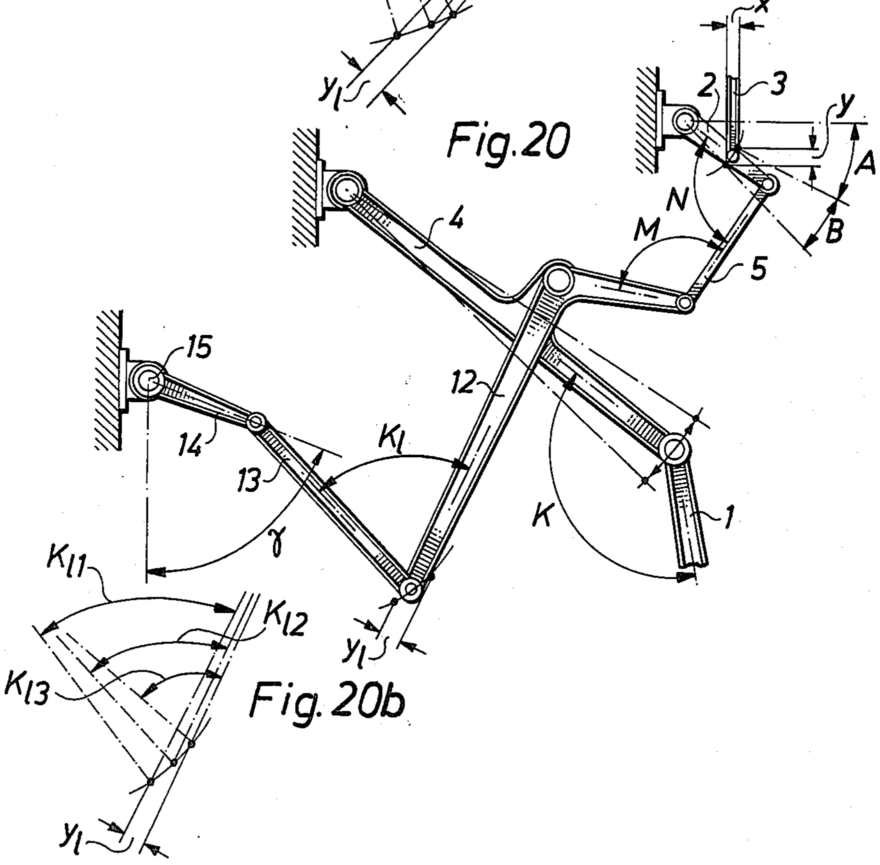
Fig. 20b

FRAME SAW WITH HORIZONTALLY MOVABLE GUIDE SYSTEM

BACKGROUND OF THE INVENTION

This invention relates to a frame saw for sawing of essentially horizontally fed timber by the type of saw having saw blades placed largely perpendicular to the direction of feed of the timber, i.e. without overhang. In such a frame saw a sash in which the said saw blades are clamped is arranged to be imparted a reciprocating upward and downward motion with upper and lower turning points in relation to and controlled by a system of guides which by means of one or several guide connecting rods and via one or several controlled guide links is arranged to be moved before the sash is phase-displaced in the direction of feed of the timber. The guide system and the guide connecting rods are designed with fulcrums in or in relation to said guide links, which are pivotably disposed.

The object of the present invention is to improve in gangsawing the cutting circumstances of the saw blades, or in other words to reduce blade stresses. A reduction of the blade stresses makes it possible to use thinner saw blades, a circumstance which gives smaller kerf losses and thus a higher timber yield. Moreover, it becomes possible to increase the production capacity per machine and unit of time.

In principle, a frame saw consists of a sash which is usually guided by vertical guides, saw blades being fastened in the said sash. The sash is driven up and down in most cases by a connecting rod and crankshaft. The timber is fed through the sash—towards the saw blades—and is then sawn apart by means of a plurality of mutually parallelly disposed saw blades, the numbers of which commonly varies between four and nine, depending on the size of the timber and how it is to be sawn.

Since a frame saw, in terms of function, resembles a reciprocating piston machine, the speed of the saw blades and thus also the cutting effect of the saw blades, will be a sinusoidal function in respect to the cutting period. In prior art conventional frame saw designs, the imperfect machine design in combination with the varying shape of the speed (sinusoidal function) of the saw blades give rise to certain difficulties and disadvantages which will be described in summary below.

The saw blades have their maximum speed in the middle of the stroke (when the crank is horizontal), and when the crank is in its upper and lower turning point respectively the saw blades are stationary. The saw blade speed has a different shape during the cutting period, a circumstance implying that the chip thickness per saw blade tooth varies within wide limits during each cutting period. The cutting period comprises only that part of each crankshaft revolution when the saw blades have downward motion. Normally, the cutting period of the saw blades commences at a crank angle of approx. 10° to 15° after the upper turning point and ends approx. 15° before the lower turning point.

In the beginning and particularly towards the end of the cutting period, the chip thickness per saw blade tooth becomes very large, and in the middle of the stroke, when the saw blades have a maximum cutting speed, it is not possible—paradoxically enough—to take advantage of the maximum cutting effect of the saw blades. Better utilization of the cutting effect of the saw blades in the middle of the stroke can, in conventional frame saws, only take place by increasing the feed rate of the timber. The increase in speed thereby attainable is, however, merely marginal, as every increase in the feed rate leads to a considerable increase in the blade stresses towards the end of the cutting period. At the end of the cutting period—when the saw blade speed is decreasing—from a crank angle of approx. 25° to the lower turning point, the cutting effect of the saw blades is so low that the saw blades chop into the timber and the feed thereof is retarded with the consequence that the saw blades are exposed to very great both horizontal and vertical loads. The horizontal stresses amount to approx. 300 to 600 N per saw blade tooth in deal frames and to approx. 1000 to 3000 N per saw blade tooth in edge frames.

The total load from the workpiece against the saw blades will be approx. 6,000 to 12,000 N in deal frames and approx. 20,000 to 60,000 N in edge frames. The vertical stresses are so great as to cause saw blade teeth to be broken off and the saw blades to tear off. The only possibility of limiting these difficulties and disadvantages in present-day frame saw structures is to design the saw blade teeth with a relatively small clearance angle so that the saw blades do not chop into the timber excessively deeply.

Towards the end of the cutting period—when the saw blades have engaged in the timber—the saw blades break off the lowest part of the saw cut in the workpiece.

The thickness of the broken-off silver may be approx. 5–8 mm and the width equivalent to twice the saw cut width. The thickness of the sliver is measured in the cutting direction of the saw blades themselves and the aforesaid thickness corresponds to a crank angle of approx. 10° to 15° towards the end of the cutting period. It is during this "sliver-forming period" that the retardation of the saw blades by the timber is at its greatest, a circumstance implying that it is during the final phase of the cutting period that the saw blades are exposed to maximum stresses.

It has previously been mentioned that the saw blades perform cutting work only during that part of each crankshaft revolution during which the saw blades have downward motion. It is thus desirable for the saw blades, during their upward motion, to be clear of the bottom of the saw cut. Attempts have been made to solve this problem by inclining the saw blades in the direction of feed (so-called overhang) as then the saw blades will move away from the bottom of the saw cut during their upward motion. Such prior art arrangements are disclosed for example by Swedish Pat. No. 194 103, German Offenlegungsschrift Nos. 1 453 181, 1 528 044, 2 721 841 and through Swiss Pat. No. 391 271.

There is some justification for the overhang design per se but unfortunately with this design, it is not possible to completely avoid so-called back sawing. This commences at the lower turning point and continues until a crank angle of approx. 65°–80° during the upward motion of the saw blades. The reason why back sawing occurs is that the sinusoidal speed of the saw blades does not increase sufficiently quickly in relation to the fed timber.

If the function design of the conventional frame saws is divided according to the position of the crank (the crank angle), the following break-down, starting from the upper turning point, is obtained:

| | |
|---|---|
| Upper turning point | Saw blade speed = 0. |
| Crank angle 0°-15° | The saw blades are clear of the saw cut bottom. |
| Crank angle 15°-25° | The saw blades commence cutting. Low cutting speed. Less effective cutting work. Large chip thickness. |
| Crank angle 25°-150° | During this crank angle, the cutting speed is high. The cutting capacity of the saw blades cannot be fully utilized. |
| Crank angle 150°-165° | The cutting speed of the saw blades is decreasing. Less effective cutting work. Large chip thickness. |
| Crank angle 165°-180° | The saw blades stop cutting and retard the timber. The mass forces in the timber and the pulling force from the feeder press the timber towards the saw blades and the tips of the teeth penetrate into the timber without cutting. The saw blades break a sliver from the lower side of the timber. |
| Crank angle 180° | Saw blade speed = 0. |
| Crank angle 180°-250° | The saw blades have upward motion. The timber is pressed against the saw blades. Back sawing. |
| Crank angle 250°-360° | The saw blades have upward motion. The saw blades run clear of the bottom of the cut in the timber. |

The following general remarks are applicable to the conventional saw frame:

1. The cutting speed of the saw blades follows a sinusoidal function and during a crank angle of approx. 25° after the upper turning point and approx. 30° before the lower turning point, the cutting effect of the saw blades is good and the blade stresses relatively small.

2. Around the turning points of the saw blades, the cutting effect thereof is poor and the blade stresses are very great.

3. After the lower turning point of the saw blades—when the saw blades have upward motion—backsawing occurs, a negative phenomenon which damages both saw blades and timber.

Such prior art arrangements are disclosed by for example German Pat. No. 881 258 and German Offenlegungsschrift Nos. 2 721 842 and 2 638 964. The closest prior art devices are disclosed by the Applicant's own Swedish Pat. No. 215 830 and U.S. Pat. No. 3,322,170.

In principle, an object of the present invention is for the cutting period of the saw blades to be located at that portion of each crankshaft revolution during which the saw blades have sufficient cutting effect and during the remaining portion of the crankshaft revolution, the saw blades must be clear of the bottom of the cut.

Eliminated by this means are the large unfavourable loads which affect the saw blades and this in turn enables sawing to be performed with saw blades having substantially smaller thicknesses than the saw blades used in present-day conventional frame saws.

The present invention also enables sawing to be carried out with virtually constant chip thickness per tooth tip, a circumstance which is of the utmost importance with regard to both the surface fineness of the machined timber and for elimination of forces unfavourable to the cutting process.

The aforesaid difficulties and disadvantages of the conventional frame saws give rise to great stresses in the saw blades and this results in the necessity of the saw blades having large thickness in order not to achieve a wavy saw cut with resultant poor dimensional accuracy of the sawn timber.

Saw blades with large thicknesses, moreover, necessitate large clamping forces in the sash, a circumstance which gives a heavy machine structure with large reciprocating masses and a low speed, which gives low cutting capacity per unit of time.

Saw blades with large thicknesses give large cutting losses and poor production economy.

By application of the present invention, it becomes possible to eliminate the difficulties and disadvantages inherent in conventional frame saw designs.

SUMMARY OF THE INVENTION

In principle, the concept of this invention is as follows. The guides of the sash are to be designed horizontally movable by means of guidance of the crankshaft and this guidance must be coordinated with the motion of the saw blades. This horizontal guide amplitude must be so adapted that the saw blades are moved forward towards the bottom of the cut when the saw blades have sufficient speed for effective cutting work and are moved away from the bottom of the cut when the cutting speed is too slow for efficient cutting work.

In other words, the cutting period of the saw blades must be essentially adapted to the sinusoidal speed curve of the saw blades, which circumstance in practice implies that the cutting period is to commence at a crank angle of approx. 20°-30° after the upper turning point and terminate at a crank angle of approx. 20°-30° before the lower turning point. The cutting period will then embrace a crank angle of approx. 140°-120° of each crankshaft revolution.

The invention also embraces a design feature enabling sawing with largely constant chip thickness (per tooth) to be performed during the entire cutting period. When sawing is performed with a largely constant chip thickness per tooth throughout the entire cutting period, better dimensional accuracy is obtained on the part of the sawn timber as well as higher production capacity per machine and unit of time.

Through the aforesaid limitation of the cutting period of the saw blades, several other advantages are obtained in comparison with conventional frame saws, viz.:

1. The retardation of the timber and the seizing of the saw blades in the timber which occurs at the end of the cutting period is eliminated.

2. Back-sawing after the lower turning point is eliminated.

3. The blade stresses will, according to points 1 and 2 above, be substantially lower, a circumstance implying that thinner saw blades may be used. Thinner saw blades = lower chip losses = higher yield.

4. The thinner saw blades enable lower cutting forces to be used in the sash, a circumstance resulting in a substantial decrease in the sash weight in relation to the weight of the sash of conventional frame saws.

5. Since the sash is lighter, the entire saw machine can be made with a lower weight.

6. Since the weight of the reciprocating masses is substantially reduced, frame saws according to the present invention can have a substantially higher speed per minute than conventional machines. A higher cutting speed gives a higher production capacity per unit of time and more uniform saw cuts on the sawn timber.

The present invention is entitled "frame saw with horizontal movable guides", the mechanical implication being that guides on either side of the sash must be able to impart to the sash and thus also to the saw blades a horizontal motional path to and from the bottom of the cut in the timber.

BRIEF DESCRIPTION OF THE DRAWINGS

FIGS. 10, 11, 12, 13, 14, 15 and 16 show variations of angles K and N, FIGS. 19, 20, 21 and 22 show alternative embodiments of the design according to FIGS. 7-9.

DETAILED DESCRIPTION

It has previously been mentioned that the saw blade speed has a sinusoidal function. Since it has been found appropriate for reasons of mechanical engineering technology to impart the the sash guides a horizontal motion from the crankshaft, the amplitude of the guides will also have a sinusoidal function. These sinusoidal functions—the saw blade crank motion and the guide crank motion—must be out of phase in relation to each other and this phase displacement must be approximately 30°-60°. The primary task of the phase displacement is, when the guide connecting rods have passed their lower turning point and have an upward motion, to move away the sash with the saw blades from the bottom of the cut, thereby avoiding that the saw blades seize in and retard the timber. The phase displacement angle "$\phi$" is exemplified in FIG. 9.

It was mentioned in the preamble of the specification that an object of the present invention is to enable sawing to be performed with thinner saw blades in that the blade stresses are reduced in consequence of improvement of the cutting circumstances of the saw blades.

In terms of design, this involves supplementation of the above-mentioned phase displaced sinusoidal functions in such a manner that the cutting depth of the saw blade tooth becomes largely equally great throughout the greater part of the cutting period.

Figure 1:
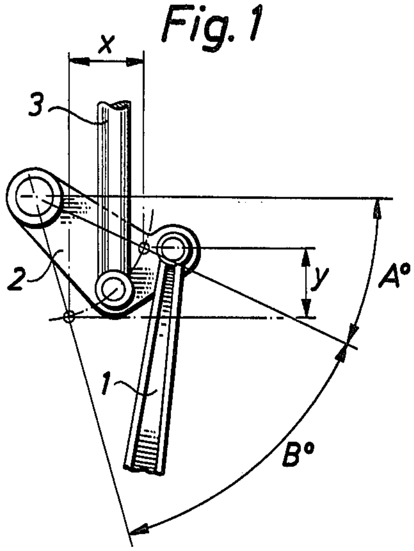
FIG. 1 shows a link construction.

FIG. 1 shows a link design with which it is possible to compensate for the decreasing sinusoidal functions towards the end of the cutting period so that a more uniform cut engagement is obtained in the timber. In FIG. 1, the machine elements are designated guide connecting rod 1, guide link 2 and sash guide 3.

Figure 2:
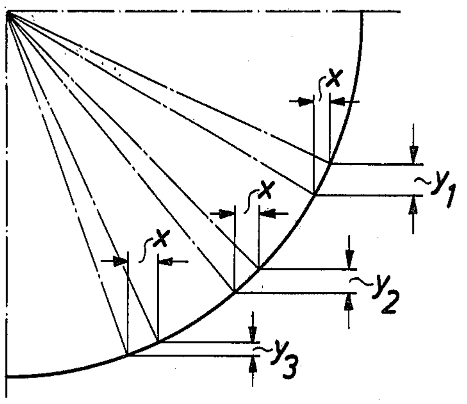
FIG. 2 shows a geometrical picture of the angle B according to FIG. 1.

As evident from FIG. 1, an arc-shaped motion is imparted to the sash guide 3 and the circular arc described by the sash guide is designated angle B. In the vertical direction, the amplitude of the sash guide is y and in the horizontal direction, the amplitude of the sash guide is x. An arc-shaped path of motion on the part of the sash guide in combination with the sinusoidal function of the saw blade crank motion and the guide crank motion has proved to be a good combination when a uniform chip thickness throughout the entire cutting period is aspired to. Angle A in FIG. 1 shows where on the circular quadrant the circular arc B is located in relation to the horizontal plane. The advantage of combining the crank motion mechanisms with an arc-shaped motion on the part of the sash guide is evident from FIGS. 2 and 3. FIG. 2 shows a geometrical picture of a sector of a circle which is corresponded to in FIG. 1 by angle B.

Figure 3:
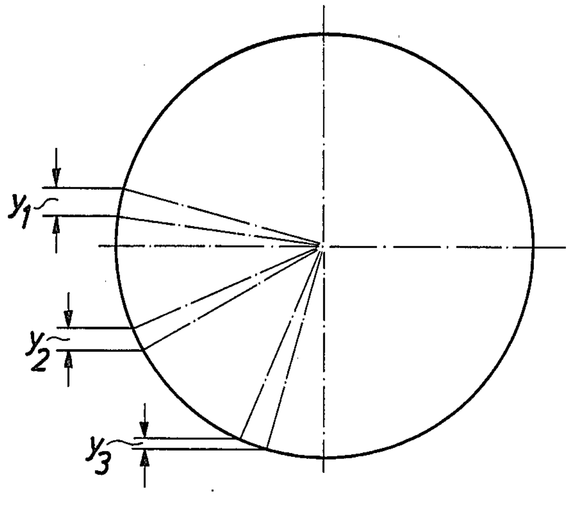
FIG. 3 shows the path of motion of the guide connecting rods

FIG. 3 shows a geometrical picture of the crankshaft and the circle represents the motional path of the guide connecting rod 1. Of the circular motion described by the guide connecting rod, only those sectors of the circle have been drawn which are of importance as a complement to the above-mentioned sinusoidal functions.

From FIGS. 2 and 3, it is evident that the horizontal partial paths x will be fairly constant despite the fact that the length of the vertical paths y are decreasing downwards towards the lower turning point. When, in other words, the lower end of the guide connecting rod 1 travels the distance y (FIG. 3), the upper end of the guide connecting rod will also move a distance corresponding to y in FIG. 2. The same also applies to the other angular values in FIGS. 2 and 3.

The object of this design is to be able to impart to the sash guides such a horizontal motion that a relatively constant cutting depth per tooth tip is obtained.

In principle, the ideas illustrated by FIGS. 1, 2 and 3 form the basis of the present invention. In the description which now follows, the motional function thereby obtained will be applied to other design embodiments of this invention.

The reason why the invention has not been confined to the above-mentioned embodiment according to FIGS. 1, 2 and 3 is the ambition that the feed rate of the timber shall and should be variable when sawing timber with different cutting heights. This requirement also implies that the amplitude x of the sash guide must be variable in size. Accordingly, the design principle illustrated by FIG. 1 must be supplemented by other embodiments.

Figure 4:
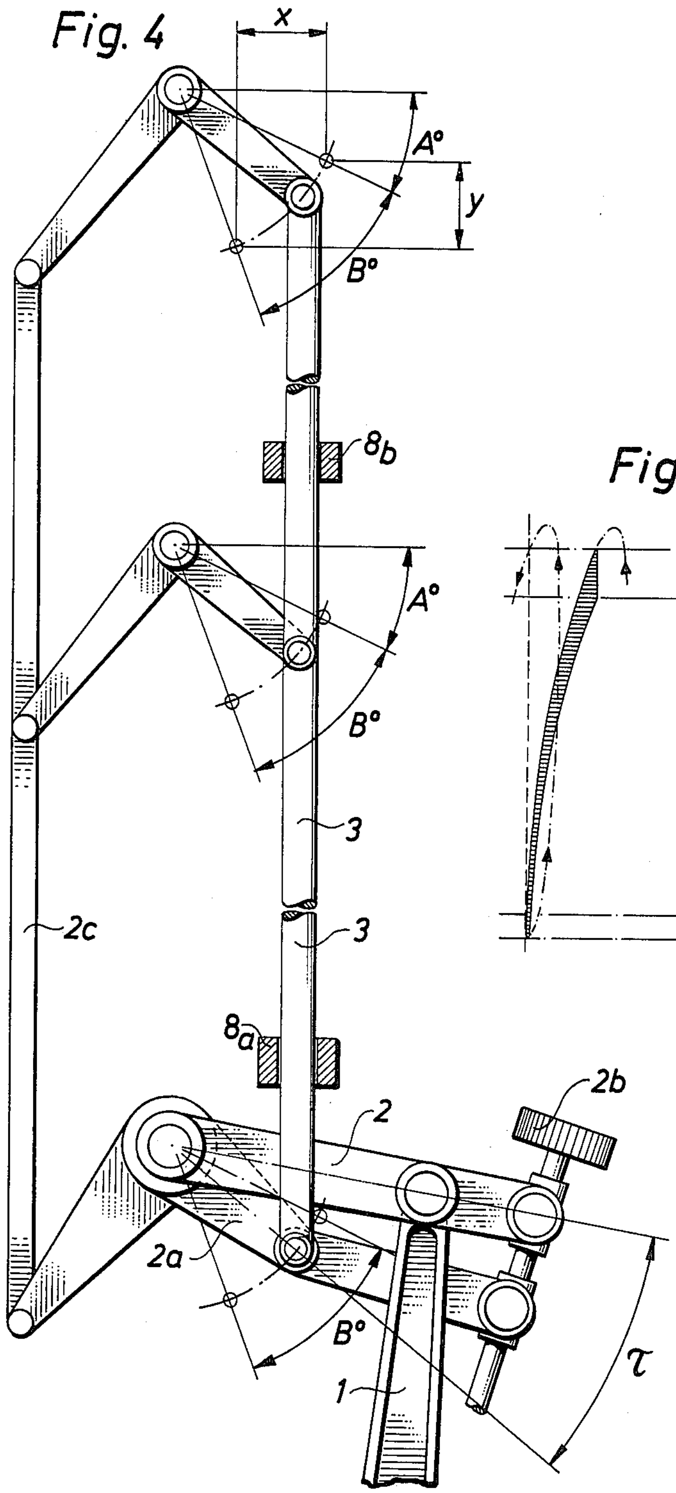
FIG. 4 shows an embodiment of the sash guide and of the lower guide link.

FIG. 4 shows an embodiment of the sash guide 3 and of the lower guide link 2 which is connected to the guide connecting rod 1. The guide link 2 is made adjustable in order for the amplitude x to be variable. It has previously been mentioned that the arc-shaped motional path B of the guide link was defined against the horizontal plane by the angle A. A reduction of angle A gives a reduction of the amplitude x and vice versa.

The guide link 2 which is carried in the machine frame has an adjustable link 2*a* hung on, links 2 and 2*a* being adjustable relative to each other by means of the setting screw 2*b*. The angle $\tau$ can thus be increased and decreased respectively, thus enabling the amplitude x to be varied.

The guide brace 2*c* serves to facilitate turning of the guide links when their angles of deflection are extremely large, i.e. when A+B is around or greater than 90°.

If the demand for variation of the amplitude x is not excessive, the design according to FIG. 4 may suffice, but in the case of large variations in the cut height of the timber and thus variation in amplitude x, it is also necessary for this design to be further developed.

Figures 5, 6:
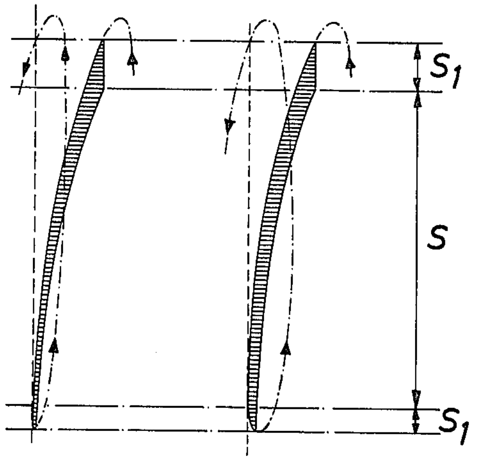
FIGS. 5 and 6 show different cutting methods and related thicknesses of chips.

When angle A in relation to angle B falls short of a certain value, the motional path of the guide link will be displaced upwards on the circular arc, a circumstance which causes the chip thickness for each saw blade tooth tip to adopt the shape shown in FIG. 5.

Obviously, the chip thickness and cutting method according to FIG. 6 should be aspired to, since by this means a higher production capacity per machine and unit of time is obtained.

FIGS. 5 and 6 show that the distance S represents the active cutting period and the distances $S_1$ the secondary cutting periods in the beginning and at the end of each active cutting period. The secondary cutting periods have a duration corresponding to roughly the distance between two tooth tips in the saw blades.

FIGS. 7, 8, 9 and 9*b* show an embodiment in which sawing with a fairly constant chip thickness within a wide variation range for x is made possible, thus as shown by FIG. 6.

Figure 7:
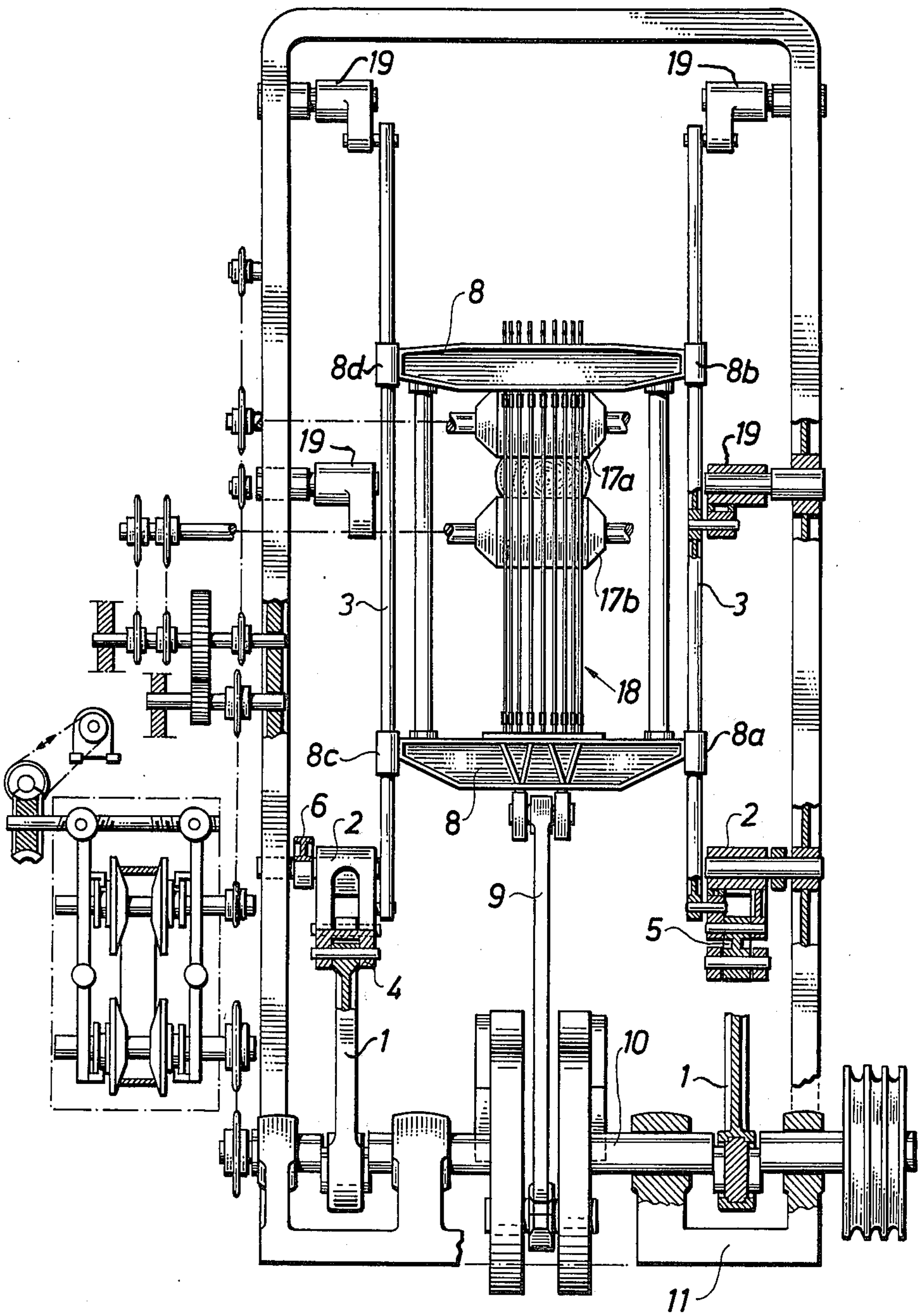
FIGS. 7, 8, 9 and 9*b* show different views of a frame saw according to the invention.

FIG. 7 shows a frame saw construction partly with members removed and viewed from the feed side of the timber to be sawn. Evident in principle from this figure is a sash 8 in which saw blades 18 are clamped, the said sash 8 being driven up and down by a cranking mechanism comprising a crankshaft 10 and a connecting rod 9. The sash 8 is also guided by four sliding shoes 8*a*–8*d*, which are movable suspended on movable sash guides 3. The sash guides 3—one on either side of the sash 8—are suspended in links 2, 19, the lowermost links 2 being imparted a reciprocating motion by its related connecting rod 1, which rods are connected to the aforesaid crankshaft 10. The sash guide 3 subsequently transmits the parallel motion to the upper guide links 19.

Figure 8:
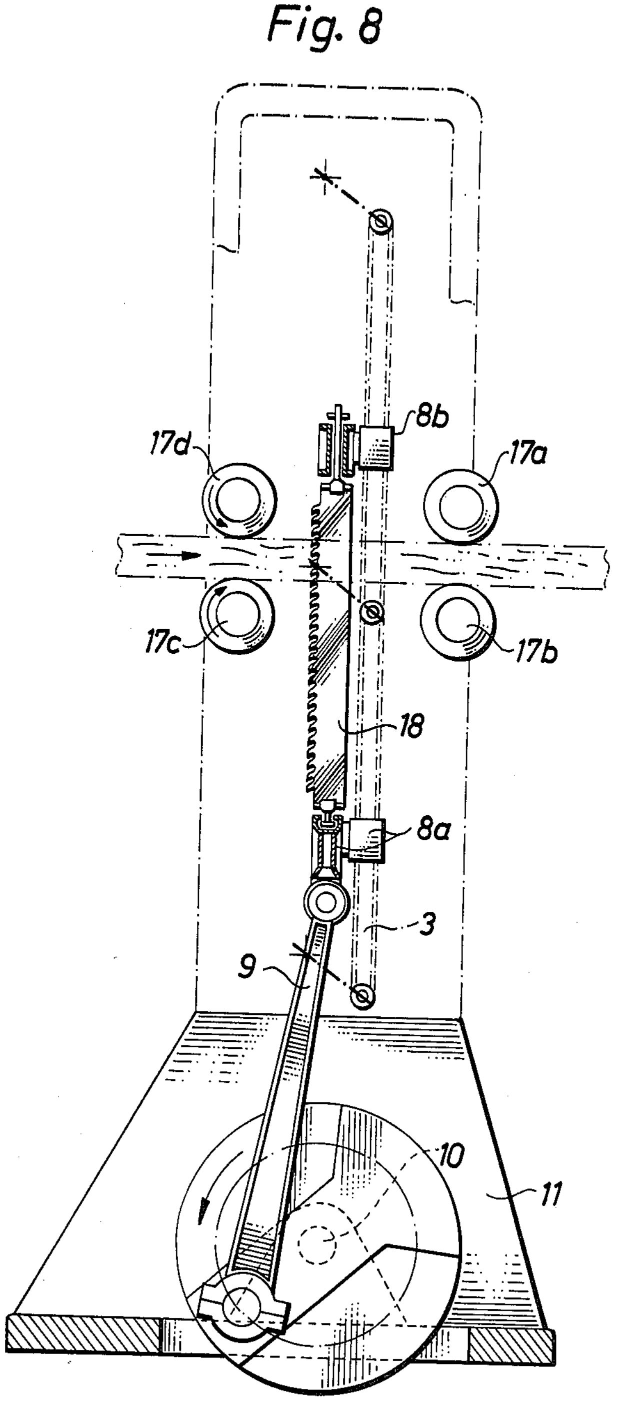
Figures 9, 9B:
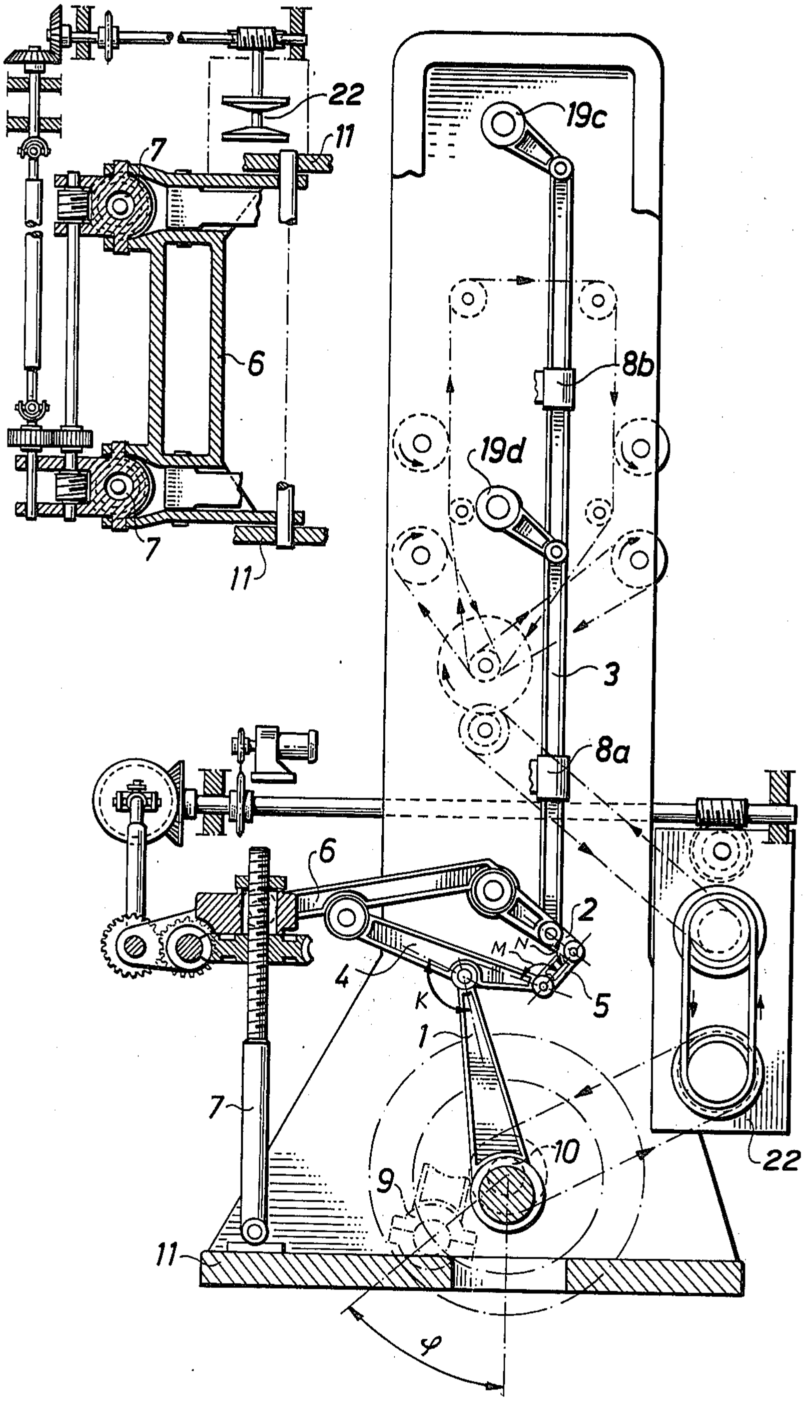

FIGS. 8 and 9 show sections of FIG. 7. FIG. 8 is a section with parts removed through the cental section of the machine, where the cranking section, i.e. crankshaft 10, connecting rod 9, sash 8, saw blades 18, timber and feed rollers 17*a*–17*d* of the machine are shown.

FIG. 9 shows one of the sash guides 3 and its suspension devices (links) and the mechanism which imparts to the links and thus to the guides the necessary reciprocating motion.

The machine elements incorporated in the aforesaid FIGS. 7, 8 and 9 have the following designations: guide connecting rod 1, lower guide link 2, sash guides 3, connecting rod link 4, coupling link 5, controller 6, control member 7 for controller, sash 8, connecting rod 9 for sash, crankshaft 10 and frame 11.

It is evident from FIGS. 7 and 9 that each guide connecting rod 1 is carried in connecting rod link 4 and between the centre lines of these machine elements, an angle K is indicated. In a similar manner, the angle N is specified between each guide link 2 and related coupling link 5.

A vital feature of this invention is the function indicated with angles K and N. These increase in fact when the guides are in downward motion and decrease when they are in upward motion, this function imparting to the saw blades 18 such a motion that sawing with a virtually constant chip thickness according to FIG. 6 can be carried out.

In addition, the guide amplitude x can be varied by inclination of the controller 6 (angle $\gamma$, see FIG. 17) by means of control member 7. Upon alteration of the angle $\gamma$, the motional path of the guide link 2 is transferred to another portion of the circular arc described by the sash guide 3, thereby enabling amplitude x to be varied in magnitude. See also FIGS. 17 and 18.

Obviously the function of angles K and N is entirely dependent upon the combinations of the machine elements and the difference between their bearing centres (pivot points) or fulcrums.

FIGS. 10–16 describe in principle particularly the above-mentioned functions of the angles K and N.

Figure 11:
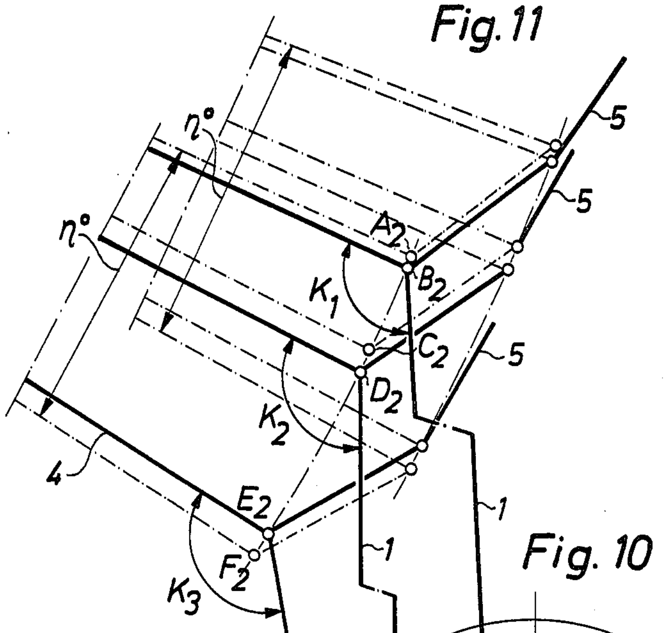
Figure 10:
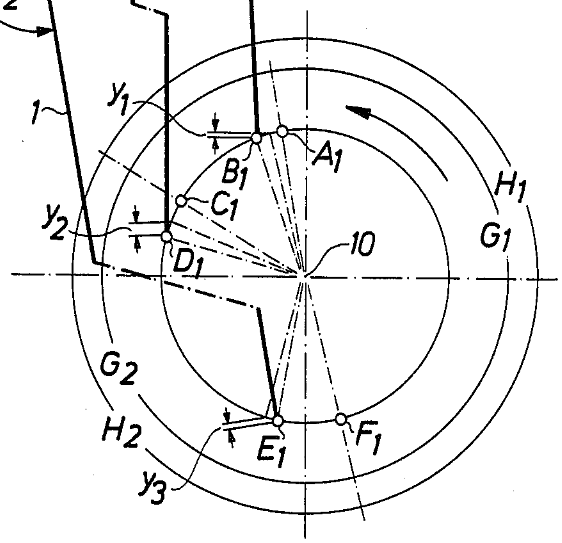
Figure 12A:
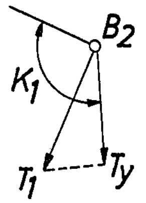
Figure 12B:
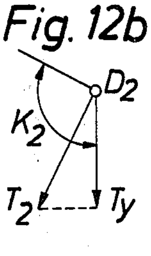
Figure 12C:
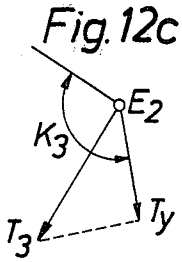

FIG. 10 shows the crankshaft function 10 of the guide crank motion, FIG. 10 shows, in principle, the same function as FIG. 3. FIG. 10 also shows the lower end of the connecting rod link 4 and its connection with the crankshaft via guide connecting rod 1. FIG. 11 also shows the lower end of the connecting rod link 4 but in conjunction with FIG. 14. FIGS. 12*a*–12*c* show how the angle K varies. FIGS. 13*a*–13*c* show how the angle M varies. FIG. 14 shows the guide link 2 and it is evident from this figure how the angle N varies with different crank angles. FIGS. 15*a*–15*c* supplement FIG. 14 by showing how angle N varies. FIG. 16 shows the horizontal amplitude of the sash guide 3 during one crankshaft revolution.

FIG. 10 shows the crankshaft function for the guide connecting rod 1, in which function six characteristic points have been selected. These points are designated $A_1$, $B_1$, $C_1$, $D_1$, $E_1$, and $F_1$ respectively.

Since the positions of the crankshaft 10 and connecting rod 1 give a corresponding definite position on the part of other machine elements, one point in FIG. 10 is designated, for example, $A_1$, the corresponding point in the upper portion of FIG. 10 and in FIG. 11 being $A_2$ and $A_3$, and in FIGS. 14 and 16, $A_4$ and $A_4$ respectively. In FIG. 10, $A_1$ is the upper turning point of the connecting rod and $F_1$ its lower turning point. The angle $G_1$ indicates when the connecting rod and associated machine elements have an upward motion and $G_2$ when the same machine elements have a downward motion. The angle $H_1$ designates the clearance period of the saw blades and the angle $H_2$ designates the cutting period of the saw blades. Dimensions $Y_1$, $Y_2$ and $Y_3$ indicate comparatively the vertical velocity of the guide connecting rod at points $B_1$, $D_1$ and $E_1$.

Dimension $Y_2$ is substantially larger than dimensions $Y_1$ and $Y_3$, which is explained by what has already been said—that the vertical speed of the connecting rod varies according to a sinusoidal function. As evident from FIG. 10, dimension $Y_1$ is beyond the cutting period $H_2$, and for this reason, an assessment of the speed of the guide connecting rods in the beginning and at the end of the cutting period need only comprise a comparison of dimensions $Y_2$ and $Y_3$.

Parenthetically, it may be added that since dimension $Y_3$ is only approximately one-third of dimension $Y_2$, it is easy to draw the conclusion that the horizontal guide speed should be approximately three times greater at the final stage of the cutting period than in the beginning thereof in order for the chip thickness to be equally large throughout the entire active cutting period. This conclusion, however, is incorrect, since allowance must also be made for the fact that the speed of the saw blades follows a sinusoidal function, a circumstance implying that the cutting effect of the saw blades is decreasing when the crank for the sash connecting rod has passed the middle of its stroke.

It is evident from FIG. 9 that the guide crank motion is phase displaced (the angle $\phi$) before the saw-blade crank motion. The cutting depth and cutting effect of the saw blades must be adapted to a constant feed rate of the timber.

From FIG. 10, it is evident that the upper end of the guide connecting rod 1—during rotation of the crankshaft—will pass through points $A_2$, $B_2$, $C_2$, $D_2$, $E_2$ and $F_2$. The angle $\eta$ indicates the angle of deflection of the connecting rod link.

In FIG. 10, the lower end of the guide connecting rod 1 is marked in points $B_1$, $D_1$ and $E_1$. The corresponding points for the upper end of the guide connecting rod are $B_2$, $D_2$ and $E_2$, and in these points angles $K_1$, $K_2$ and $K_3$ are stated.

FIGS. 12a–12c show how angle K increases as the upper end of the guide connecting rod moves from $B_2$ to $D_2$ and $E_2$. If a specific value $T_y$ is allocated to the speed component of the guide connecting rod, it becomes evident from FIGS. 12a, 12b and 12c how the speed component $T_1$, $T_2$ and $T_3$ of the connecting rod link increases with the increase of the angle K.

In describing FIG. 10, it was pointed out that the point $B_1$ lay beyond the cutting period and the same thing also applies to point $B_2$. When assessing the accelerating speed imparted to the connecting rod link towards the end of the cutting period, it is thus the speed components $T_2$ and $T_3$ which are to be compared. See FIGS. 12b and 12c.

From FIG. 9, it is evident that from connecting rod link 4 the motion thereof is transmitted to guide link 2 via coupling link 5.

FIG. 11 shows the lower end of the coupling link and FIG. 14 its upper end. During the reciprocating motion of the connecting rod link, the ends of the coupling link will pass through points $A_3$, $B_3$, $C_3$, $E_3$ and $F_3$, and $A_4$, $B_4$, $C_4$, $D_4$, $E_4$ and $F_4$ respectively.

FIGS. 13a–13c and FIGS. 15a–15c show the appearance of the speed components at the lower and upper end of the coupling link respectively. Comparative speed components, namely $P_y$ and $\epsilon_y$ are inserted in FIGS. 13a–13b and 15a–15c.

In a comparison of the speed components $P_2$ and $P_3$ in FIGS. 13b and 13c, it is evident that between $D_3$ and $E_3$ the speed increase will unfortunately be negative since the angle M is decreasing. Obviously, when dimensioning, an investigation should be made as to which combination of machine elements gives the lowest negative change of the angle M and this negative effect must naturally be compensated by the positive increases obtained as functions of the angles K and N.

In contrast, a speed increase is obtained between points $D_4$ and $E_4$, a circumstance which is evident from FIGS. 15b and 15c upon comparing the components $\epsilon_2$ and $\epsilon_3$.

In summing up, it is evident that a horizontal speed increase on the part of the sash guides during the cutting period is achieved partly by the inclination of the guide connecting rod against the cutting rod link—angle K—and partly by the inclination of the coupling link against the guide link—angle N—and this speed increase serves the purpose of compensating for the decrease in vertical velocity of the guide crank motion on account of its sinusoidal function.

FIG. 16 shows the result of this differently shaped speed on the part of the sash guides, namely that point $D_1$, which in FIG. 10 is in the vicinity of the middle point of the guide crank motion while the corresponding point $D_5$ in FIG. 16 is substantially displaced from the middle point of the horizontal amplitude of the sash guide—i.e., in the beginning of the cutting period. FIG. 16 also shows that $G_1$ represents the return movement of the sash guide and $G_2$ its forward motion. Distance $H_2$ in proportion to $G_2$ (in FIG. 16) comprises a measure of the speed increase obtained by the sash guides in the above described manner.

It has previously been mentioned that it must be possible for the feed rate of the timber to be variable, primarily in view of its cutting height. The implication is that the horizontal amplitude of the saw blades, and thus of the sash guides, should be variable in size.

FIG. 9 shows that by means of a control member 7, the controller 6 can be inclined for the purpose of variation of the amplitude x, the angle $\gamma$ indicating the magnitude of this inclination.

Figure 17:
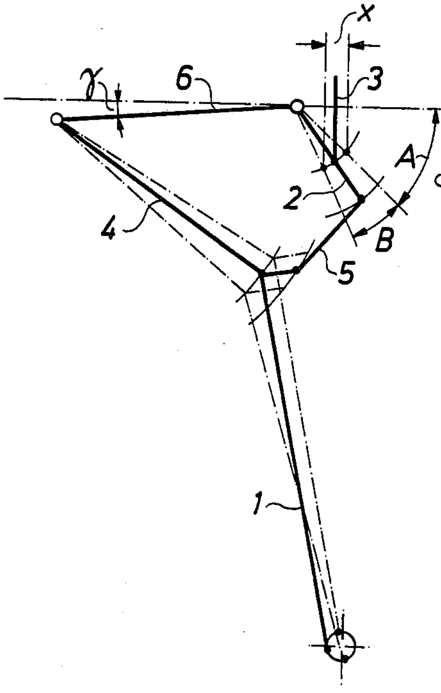
FIGS. 17 and 18 show variation of the amplitude x and y.
Figure 18:
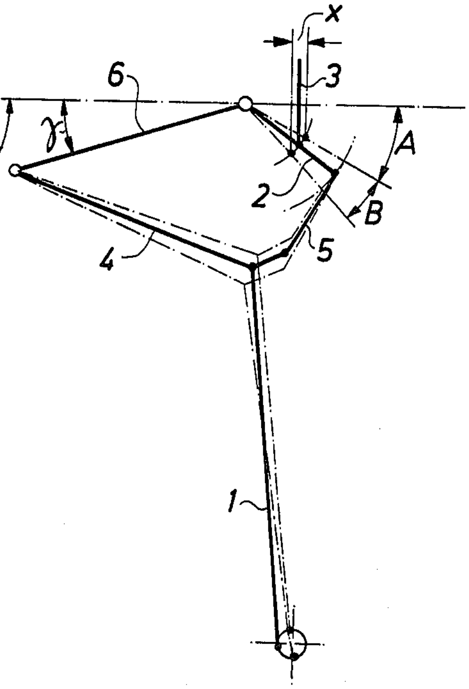

FIGS. 17 and 18 illustrate the principle of this. The angle $\gamma$ is inversely proportional to the amplitude of the sash guides. A smaller angle $\gamma$ gives a larger horizontal amplitude $G_2$ and a larger angle $\gamma$ gives a smaller horizontal amplitude $G_2$.

The reason why the amplitude x needs to be variable is that it must be possible for the cutting depth of the saw blades to be varied during each cutting period in view of the cutting height of the timber. The distance the timber is fed during each cutting period must then be adapted to the amplitude x of the saw blades if it is to be possible to utilize the maximum cutting effect of the saw blades.

It is evident from FIGS. 7 and 9 that the crankshaft 10 also drives a speed variable transmission 12. From the transmission 22 the driving force is transmitted to the feed rollers 17a–17d of the machine via gears and chain drives (not expressly specified in this specification), so that the feed rollers of the machine will be driven synchronously with the crankshaft 10.

It is also evident from FIGS. 7 and 9 that the governing device of the speed variable transmission 22 is connected to the control member 7 which sets the controller 6 at different angles $\gamma$.

FIG. 9b shows the controller 6 viewed from above. Seen in FIGS. 9 and 9b is the pivoted suspension of the control member 6 in the controller and how the control member is driven by the shaft which is connected to the governing device in the transmission 22.

The embodiment of FIGS. 7, 9 and 9b shows, in principle, how the feed rate of the timber is regulated in relation to the horizontal amplitude of the saw blades.

The invention is not confined to one embodiment as above but also embraces other features, for example other mechanical and/or hydraulic embodiments.

FIGS. 19, 20, 21 and 22 show alternative embodiments of the design according to FIGS. 7, 8 and 9. In principle, the design according to FIGS. 19, 20, 21 and 22 is merely a matter of varying the length of the coupling link 5 and thus moving the sash guide 3 to a different circular sector for the motional path of the guide link.

The controller 6 is replaced in the instance by control links 12, 13 and 14 and by a connection shaft 15 which comprises the connection shaft between the right and left sides of the machine.

The connecting rod link 4 which previously was carried in controller 6 is, in the embodiments according to FIGS. 19 to 22, carried directly in the machine framework. The implication is that the angle K in this alternative will not vary with varying amplitudes of x.

FIGS. 19 and 20 show that the coupling link 5 via the control link is connected to the connecting rod link 4.

Control link 12 is guided at its lower end by the control links 13 and 14.

Control link 14 can be set at different angles ($\gamma$) in order to obtain the desired sash amplitude x. An increase of the angle $\gamma$ gives a decrease in the amplitude x and vice versa.

An angle $K_1$ is shown between control links 12 and 13 and when the connecting rod link is in motion, the bearing points or fulcrums between the control links 12 and 13 will describe an arc-shaped motional path. If the connection shaft 15 is placed in such a manner that the angle $K_1$ becomes pointed—even when the connecting rod link 4 is located in its upper turning point—the control link 12 will be imparted a torsional motion when the connecting rod link 4 moves up and down. The torsional motion of the control link 12 can be utilized to impart to the sash guide an increased feed speed during the latter half of the cutting period. The increased feed speed referred to here is illustrated by FIGS. 19*b* and 20*b*. The dimension $Y_1$ and the angles $^K1_1$, $^K1_2$ and $^K1_3$ indicate the torsional motion of the control link 12.

Figure 21:
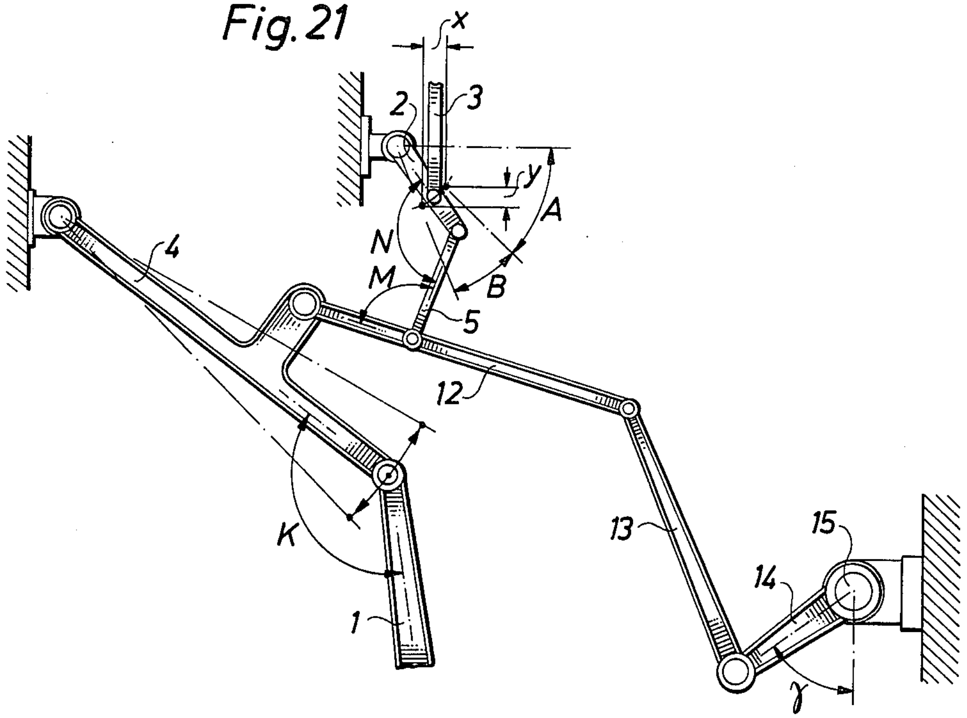
Figure 22:
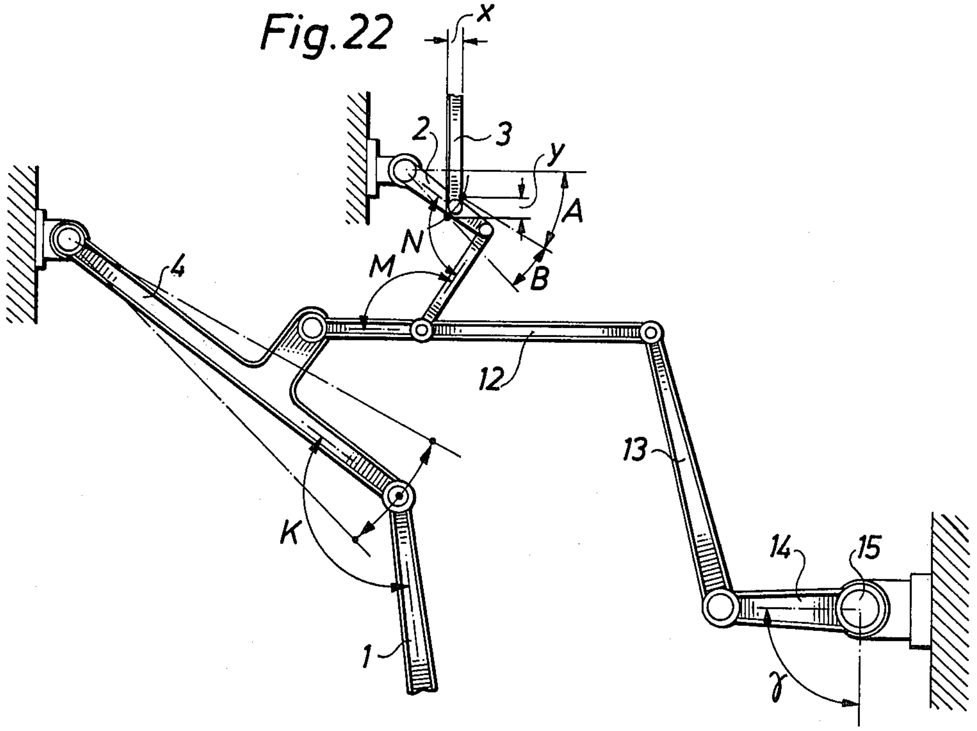

The primary advantage of this design is that the dimensioning of lengths of the connecting rod 1, connecting rod link 4 and the stroke of the crankshaft can be elaborated with greater freedom when the torsional motion according to FIG. 19*b* and 20*b* is available as a complement. FIGS. 21 and 22 show an embodiment which actually merely constitutes a variant of the embodiment according to FIGS. 19 and 20.

Both of these embodiments have a feature in common, namely that the upper end of the connecting rod link is securely attached to the machine framework. This is an advantage since the accelerating motion obtained by the connecting rod link—and described in connection with FIGS. 11 and 12—will then be constant regardless of variation in the amplitude x. A disadvantage of the embodiment according to FIGS. 7, 8 and 9 is that upon increase and decrease respectively of the angle $\gamma$, the phase displacement angle $\phi$ will also be changed. The embodiments according to FIGS. 19 to 22 allow a hundred percent guidance of the saw blades during both the cutting and the clearance period.

In the embodiment of the machine guide mechanism according to FIGS. 19 to 22, the controller 6 has—as mentioned above—been replaced by control links 12 to 14 and by connection shaft 15.

In the embodiment according to FIGS. 7, 8 and 9, the inclination of the controller—the angle $\gamma$—is connected to the control device for the variable transmissions by means of a motor-driven or, alternatively, hand-driven control device.

In the embodiment of the machine guide mechanism according to FIGS. 19 to 22, the control device for the variable transmission must be linked to the connection shaft 15 so that the angle $\gamma$ may be varied, thus enabling coordination of the feed rate of the timber and the horizontal amplitude of the saw blades during every cutting period.

I claim:

1. In a frame saw of essentially horizontally fed timber comprising a plurality of spaced apart saw blades (18) located substantially perpendicular to the direction of feed of the timber; a sash (8) in which said saw blades (18) are clamped; guide means (3) on which said sash (8) is reciprocably mounted for movement in a reciprocating generally upward and generally downward motion with upper and lower turning points; a crankshaft (10) pivotally coupled to said sash (8) for reciprocably moving said sash (8) relative to said guide means (3); connecting means (12) for moving said guide means (3) by a predetermined displacement in the direction of feed of the timber before the sash (8) is moved; said guide means (3) and connecting means (1, 2) each defining respective pivot points or fulcrums in or in relation to said connecting means (1, 2);

the improvement wherein:

said pivot points or fulcrums of said guide means (3) are located in relation to said pivot points or fulcrums of said connecting means (1, 2) such that said fulcrums of said guide means (3) move along a circular arc with a shorter radius than do said fulcrums of said connecting means (1, 2) to create a phase displacement between the movement of said guide means relative to the movement of said saw blades, so as to impart to said guide means (3) and thus to said sash (8) carrying said saw blades (18) a movement with such a horizontal component as to cause said guide means (3) to be displaced against the essentially horizontal feed direction of the timber when said sash (8) and thus said saw blades (18) are in the vicinity of said upper turning point and during a downward movement, and in such a complementary movement with a horizontal component in the essentially horizontal feed direction of the timber when said sash (8) and thus said saw blades (18) are in the vicinity of said lower turning point and on their way up so that said sash (8) and thus said saw blades (18) over and above the horizontal motion during their downward and upward movement are also imparted during the cutting period of said saw blades (18) with such a horizontal complementary motion that the cutting engagement of said saw blades (18) with the timber becomes substantially constant (FIG. 6) during the greater part of the cutting period.

2. Frame saw according to claim 1, wherein said connecting means includes at least one guide link (2, 5, 4, 6 of FIG. 9; 5, 13, 12 4, 14, 15 of FIG. 20; 5, 12,4,13,14,15 of FIG. 22) coupled to said guide means (3) for moving said pivot points or fulcrums of said guide means (3) with differing speeds at different points along said circular arc.

3. Frame saw according to claim 2, wherein said connecting means includes at least one connecting rod (1) coupling said at least one guide link to said crankshaft (10).

4. Frame saw according to claim 1, wherein said connecting means includes at least one connecting rod (1) coupled to said crankshaft (10); and at least one guide link (2) coupling said connecting rod (1) to said guide means (3).

5. Frame saw according to claim 3 or 4, wherein said at least one guide link is pivotably disposed, as viewed in the direction of feed of the timber, before said pivot points or fulcrums of said guide means (3).

6. Frame saw according to claim 5, wherein said guide means (3) comprises two guides (3) on respective opposing sides of said sash (8); and said connecting means includes two guide links (2) pivotably disposed in relation to the frame of the frame saw, and two guide connecting rods (1) pivotally coupled to a respective associated guide link (2); each of said guides (3) being also pivotably connected to a respective associated guide link (2).

7. Frame saw according to claim 3 or 4, wherein said guide means (3) comprises two guides (3) on respective opposing sides of said sash (8); and said connecting means includes two guide links (2) pivotably disposed in relation to the frame of the frame saw, and two guide connecting rods (1) pivotally coupled to a respective associated guide link (2); each of said guides (3) being also pivotably connected to a respective associated guide link (2).

8. Frame saw according to claim 7, comprising manual adjustment means (2*a*, 2*b*, 2*c*) coupled to said guides (3) for manually adjusting the position of said guides (3) relative to their associated guide connecting rod (1).

9. Frame saw according to claim 7, further comprising feed rollers (17*a*–17*d*) for feeding of the timber; and adjustment means (6,7,4,5,2 of FIG. 9) coupled to said guides (3) for adjusting the position of each guide (3) in relation to said pivot point or fulcrum of said guide connecting rod (1);

said adjustment means including a controller (6,7,4,5,2 of FIG. 9) for adjusting the position of said guides (3) as a function of the feed rate at which the timber is being fed into the saw by said feed rollers in order to maximize the feed rate of the timber while retaining a largely constant cutting engagement between said saw blades and the timber during the cutting period and keeping said saw blades clear of the bottom of the saw notches during the remaining portion of each crankshaft revolution.

10. Frame saw according to claim 9, wherein said controller includes an adjustment unit (7) which is pivotably connected to an initial link (6) which in turn is pivotably connected to the guide connecting rods (1) via a second link (4) which in turn via a third link (5) is connected to the guide links (2) for the purpose of moving said guide means (3) at different speeds.

11. Frame saw according to claim 3 or 4, wherein said at least one guide link includes a linkage system which comprises a first guide link (2) pivotally connected relative to the frame of the frame saw;

a second link (4), one end of which is pivotably attached relative to the frame of the frame saw and the other end of which is pivotally coupled to said at least one connecting rod (1);

a third link (2) and a fourth link (12), which fourth link (12) in turn is pivotably attached to said second link (4);

a fifth link (13) pivotally coupled at one end to said fourth link (12) and pivotally coupled (15) relative to the frame of the frame saw via a sixth link (14), for the purpose of synchronizing the associated system of links of each guide link (2) and to adjustably alter the horizontal amplitude;

said first through sixth links essentially have motional paths in circular sectors, with sinusoidal speed components, which complement the various speeds (sinusoidal functions) of movement of the saw blade and said at least one connecting rod (1), particularly during the latter half of the cutting period such that an angle N between said first guide link (2) and its associated third link (5), and an angle K between said second link (4) and its associated connecting rod (1) are made to increase and, when applicable, such that an angle $K_1$ between said fourth link (12) and said fifth link (13) is made to decrease in size, whereby an accelerating speed is imparted to the fulcrum of each first guide link (2) and its associated third link (5) when said saw blades (18) are travelling downwards during the cutting period to provide a fairly constant cutting engagement between said saw blades (18) and the timber during the cutting period, whereas during the remaining portion of each crankshaft revolution, the horizontal motion of said sash (8), in consequence of the movements of said linkage system, is such that said saw blades (18) go clear of the bottom of the saw notches, despite the fact that the timber is being fed forward with a substantially constant speed.

12. Frame saw according to claim 11 wherein said guide means (3) comprises two guides (3) on respective opposing sides of said sash (8); and wherein said connecting means includes two guide connecting rods (1) associated with respective ones of said two guides (3); said connecting means further comprising a second linkage system of said first through sixth links each linkage system coupling a respective connecting rod (1) to its associated guide (3).

13. Frame saw according to claim 1, wherein said connecting means is located at the feeding-in side of the saw.

* * * * *

UNITED STATES PATENT AND TRADEMARK OFFICE

CERTIFICATE OF CORRECTION

PATENT NO. : 4,287,800

DATED : September 8, 1981

INVENTOR(S) : Gustaf A. PERSSON

It is certified that error appears in the above—identified patent and that said Letters Patent is hereby corrected as shown below:

Column 10, line 17, change "transmission 12" to --transmission 22--.

Column 11, line 58, change "means (12)" to --means (1, 2)--.

Signed and Sealed this

*Fifth* Day of *January 1982*

[SEAL]

*Attest:*

GERALD J. MOSSINGHOFF

*Attesting Officer* *Commissioner of Patents and Trademarks*